United States Patent [19]
Allen

[11] Patent Number: 5,944,169
[45] Date of Patent: Aug. 31, 1999

[54] AUXILIARY PORTABLE CONVEYOR FOR USE AT AN AIRLINE LUGGAGE CHECK-IN COUNTER

[76] Inventor: David S. Allen, 4959 SE. 72nd Ave., Carlisle, Iowa 50047

[21] Appl. No.: 08/856,416

[22] Filed: May 14, 1997

[51] Int. Cl.[6] .................................................. B65G 47/04
[52] U.S. Cl. ................... 198/535; 198/370.09; 198/538; 193/35 R; 186/59
[58] Field of Search .............................. 198/370.09, 535, 198/536, 538; 193/35 R; 186/59, 60, 68

[56] References Cited

U.S. PATENT DOCUMENTS

| | | | |
|---|---|---|---|
| 1,380,691 | 6/1921 | Tuohy . | |
| 2,904,196 | 9/1959 | Teixeira | 193/35 R |
| 4,265,336 | 5/1981 | Foster | 186/68 |
| 4,392,553 | 7/1983 | Foster | 186/68 |
| 4,753,337 | 6/1988 | Grosjean . | |
| 5,353,903 | 10/1994 | Kechel et al. | 198/535 |
| 5,456,348 | 10/1995 | Whetsel et al. . | |

*Primary Examiner*—Joseph E. Valenza
*Attorney, Agent, or Firm*—Henderson & Sturm

[57] ABSTRACT

A removable conveyor disposed between the scale platform of an airline check-in and the main conveyor system for transporting luggage to be loaded on an airplane. The portable conveyor is constructed of lightweight materials, such as aluminum, and is easily manipulated by the check-in counter attendant. In one embodiment the removable conveyor is pivotally attached to a side rail of the main conveyor so that it may be easily moved by the attendant between the horizontal working position and the vertical storage position. A locking mechanism is provided to secure the movable conveyor in the storage position.

16 Claims, 2 Drawing Sheets

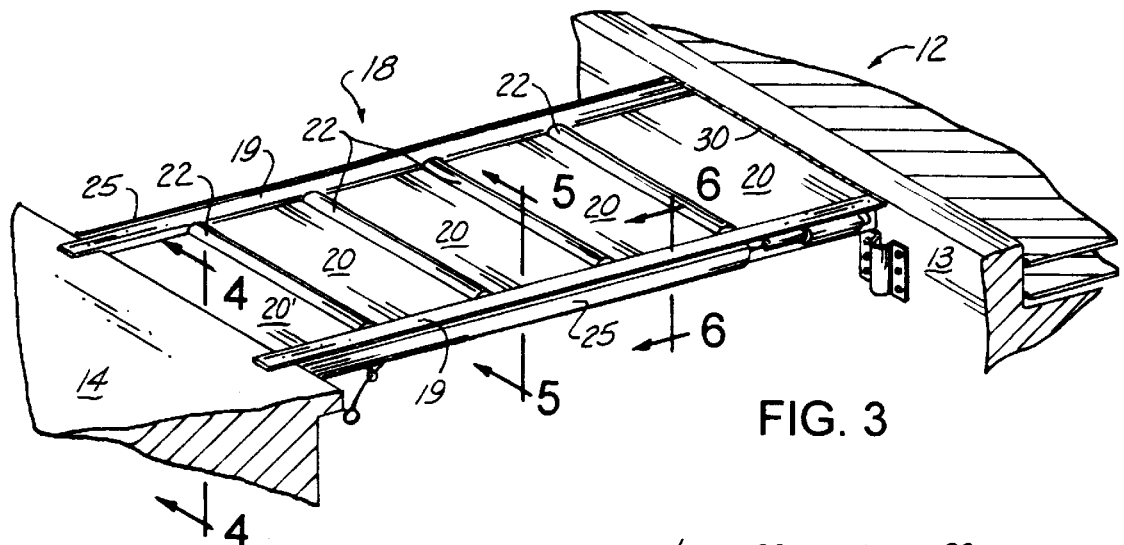
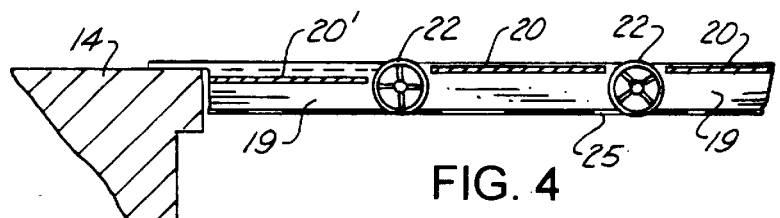
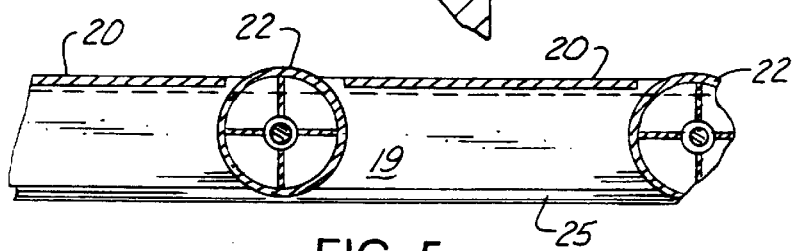
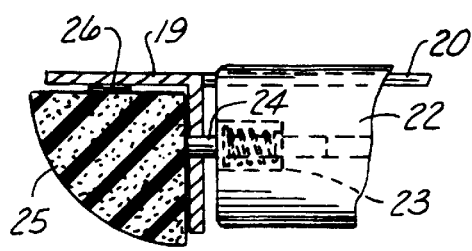
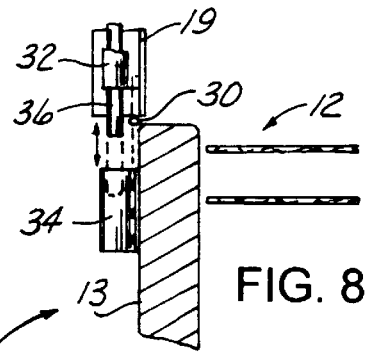
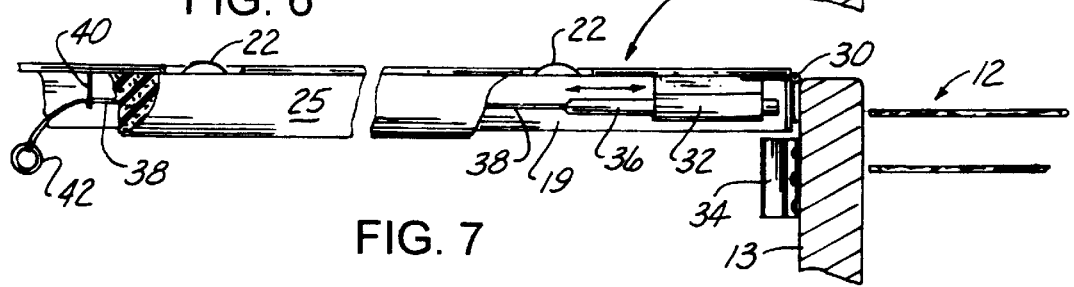

AUXILIARY PORTABLE CONVEYOR FOR USE AT AN AIRLINE LUGGAGE CHECK-IN COUNTER

CROSS-REFERENCE TO RELATED APPLICATIONS

This application contains disclosure from and claims the benefit under 35 U.S.C. §119(e) of U. S. provisional application, Ser. No. 60/018,730, filed May 31, 1996, and entitled "Auxiliary Portable Conveyor For Use At An Airline Luggage Check-In Counter," which application is incorporated herein by reference.

STATEMENT REGARDING FEDERALLY SPONSORED RESEARCH OR DEVELOPMENT

Not Applicable

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to auxiliary portable conveyors and more particularly to such a conveyor designed for use at an airline luggage check-in counter to make possible the movement of the checked-in luggage to a conventional nearby main conveyor system on which the luggage is delivered to a loading area under conditions that do not require the check-in attendant to lift, carry or otherwise manhandle the luggage other than guiding it over the auxiliary conveyor.

2. Description of the Related Art

It is standard practice throughout the airline industry that an airline customer with luggage to be checked for loading on the plane will deposit the luggage on a scale platform built into the check-in counter. The attendant after properly tagging the luggage for its appropriate destination must get it to the loading area for the plane and for this purpose the airlines provide a main conveyor system. The main conveyor passes through the check-in area several feet behind the platform where the luggage is tagged. The main conveyor moves the luggage to the loading area for other personnel to handle.

Once the luggage is checked, the attendant must physically lift or carry it from the check-in counter platform to the nearby main conveyor. For some airline check-in personnel this task of physically lifting and carrying the luggage is not a problem, but with more and more heavy and larger pieces of luggage being checked through today, experience has clearly demonstrated that the airlines are being confronted with a growing array of health and injury problems that are proving to be very costly for the following reasons.

The airlines, and for that matter most employers generally, do not have the luxury under current laws of hiring only the healthy and strong. The labor force includes many persons with a variety of disabilities, many of small frames and stature who cannot satisfactorily handle a job requiring much physical effort and many of whom have serious health conditions. For the airline industry this wide array of employees has produced many lost work hours and added overhead expense due to claimed injuries from handling heavy luggage pieces, and time off for certain health related conditions. One such health related condition is pregnancy where the person involved must take time off from her regular job as soon as her condition does not permit the physical effort needed to handle the luggage at her counter. The airline industry is faced with the constant problem of what is known as OJI or on the job injury. Job hours are lost to injuries and health conditions affected by the job requirements. This translates into substantial additional overhead expense due to Workmen Compensation claims, overtime, and double overtime pay required in certain circumstances where employees have to be temporarily replaced because they cannot handle the physical part of their job.

Those concerned with these and other problems recognize the need for an improved system for handling luggage at an airline check-in counter.

BRIEF SUMMARY OF THE INVENTION

The present invention discloses a removable conveyor disposed between the scale platform of an airline check-in and the main conveyor system for transporting luggage to be loaded on an airplane. The portable conveyor is constructed of lightweight materials, such as aluminum, and is easily manipulated by the check-in counter attendant. In one embodiment the removable conveyor is pivotally attached to a side rail of the main conveyor so that it may be easily moved by the attendant between the horizontal working position and the vertical storage position. A locking mechanism is provided to secure the movable conveyor in the storage position.

The removable conveyor is designed to overcome the disadvantage of the present airline counter workplace related to the handling of luggage. It provides an environment that minimizes the possibility of an attendant being injured from handling the luggage and thereby substantially reduces the loss of job time from claimed injuries and permits pregnant employees to remain on the job for a much longer time. Due to these advantages, the overhead expense for the employer are reduced by significant amounts.

The foregoing objective of this invention is accomplished by providing a portable auxiliary conveyor which can be removably inserted between the platform at the counter on which the luggage is tagged and the nearby conventional main conveyor, and thus bridge the gap over which luggage was previously required to be manually negotiated. When in the horizontal working position, the removable conveyor is planar with the two connecting points, the check-in platform and conventional main conveyor. The removable conveyor is provided with spaced rollers so that the checked-in luggage need only be pushed over rollers to the main conveyor. By this arrangement, the requirement for physical strength for part of the job of an airline luggage check-in attendant is eliminated together with all of the disadvantages flowing therefrom.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 3 is a perspective view illustrating an embodiment of the invention wherein one end of the removable conveyor is pivotally attached to the main conveyor;

FIG. 4 is a sectional view taken along line 4—4 of FIG. 3, showing the engagement of the other end of the removable conveyor with the scale platform at the check-in counter;

FIG. 5 is an enlarged sectional view taken along line 5—5 of FIG. 3, showing the relative position of the rollers and the slide plates;

FIG. 6 is an enlarged sectional view taken along line 6—6 of FIG. 3, showing the attachment of a cushioned guard to the side rail by Velcro strips, and showing the spring pin of the roller in dashed line;

FIG. 7 is a side elevational view of the removable conveyor in the horizontal working position, with portions cut away to show the locking mechanism; and FIG. 8 is a side elevational view of a portion of the removable conveyor in the vertical storage position, with a dashed line showing of the locking pin dropping into the lower pin sleeve.

DETAILED DESCRIPTION OF THE INVENTION

Figure 1:
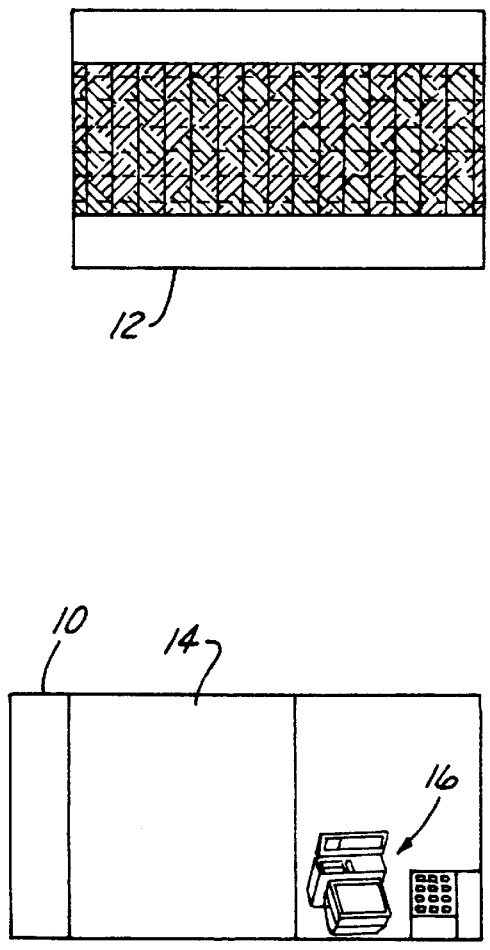
FIG. 1 is a top plan view of the area associated with the airline luggage check-in area.

Referring now to the drawings, wherein like reference numerals designate identical or corresponding parts throughout the several views, FIG. 1 shows the check-in area at the counter of an airline at an airport which includes the check-in desk or counter (10) for servicing a customer. Spaced rearwardly from the counter (10) is an endless main conveyor (12) which is a fixed installation and on which check-in luggage is eventually delivered for loading on a plane as will appear. In the counter (10) is a cutout providing a lower level scale platform (14) on which a customer places their luggage when checking in for the flight. Miscellaneous equipment (16) on the counter (10) is for use by the attendant.

Figure 2:
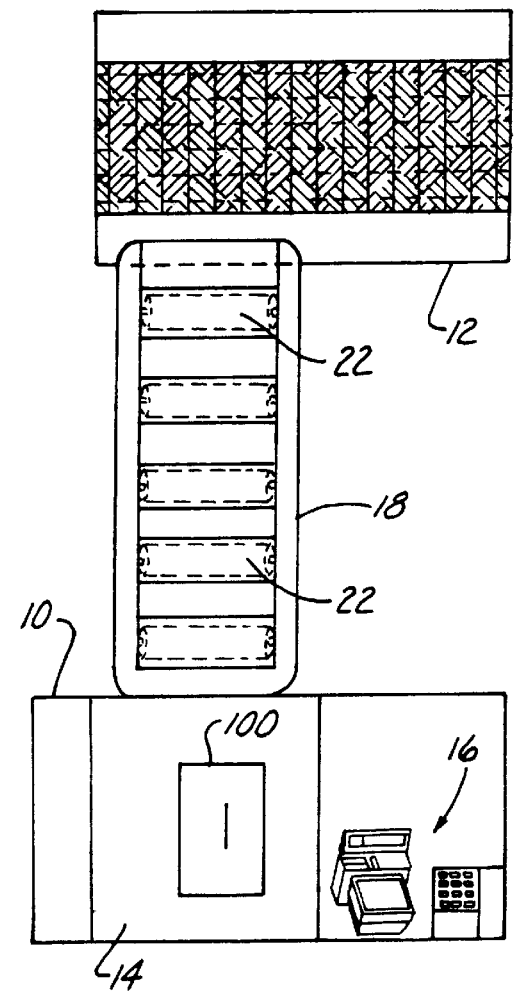
FIG. 2 is a top plan view similar to FIG. 1 and including the new conveyor arrangement provided by this invention.

The environment in FIG. 1 is duplicated in FIG. 2 and in such FIG. 2 there is shown a portable auxiliary conveyor (18) disposed between and removable connected to the counter (10) and the main conveyor (12). An item of luggage (100) is indicated in FIG. 2 on the platform (14). The formerly open space between the counter (10) and the main conveyor (12) is now bridged by the auxiliary conveyor (18) so that it is no longer necessary for an attendant to lift or carry the luggage from the platform (14) to the main conveyor(12).

The auxiliary conveyor (18) is provided with longitudinally spaced rollers (22) to facilitate the movement of the luggage (100) so all the effort that is required of the attendant is to push and guide the luggage (20) from the platform (14) to the main conveyor (12). This elimination of a requirement for physical strength by the check-in attendant has materially eliminated lost job hours and created an improved working environment.

It will be understood that the portable conveyor (18) can be removably secured to the platform (14) and the main conveyor (12) in any suitable manner which may include hinges, clips aid any desired form of fastener. Also, such conveyor (18), for which no invention is claimed per se, may be made adjustable and foldable by anyone skilled in the art. The auxiliary conveyor (18) may be of any suitable material, and preferably of a lightweight material such as aluminum.

FIGS. 3–8 show one embodiment of the auxiliary conveyor (18) constructed of angle aluminum side rails (19), a number of spaced aluminum slide plates (20) that extend between and interconnect the side rails (19), and a number of lightweight rollers (22) disposed in the spacing between the slide plates (20). A spring pin mechanism (23) is disposed in the ends of the rollers (22), and a pin (24) extends from each mechanism (23) and is received in openings in the side rails (19) to secure the rollers (22) in position. A cushioned guard (25) is attached to the side rails (19) by Velcro (26).

As illustrated in FIGS. 3 and 4, the slide plate (20') adjacent to the platform (14) is recessed down from the top of the rails (19) so that the top surface of the slide plate (20') will be flush with or below the top surface of the platform (14). This facilitates the initial sliding of the luggage (100) from the platform (14) onto the auxiliary conveyor (18). Also, the ends of the side rails (19) are cut to remove the vertical section of the rail angle so that the horizontal section will rest directly on the top surface of the platform (14).

As shown in FIGS. 3, 7 and 8, a hinge (30) pivotally attaches the auxiliary conveyor (18) to a side rail (13) of the main conveyor (12). Attachment by the hinge (30) allows for pivotally movement of the auxiliary conveyor (18) between the horizontal working position and the vertical storage position (FIG. 8).

A locking mechanism is provided for securing the auxiliary conveyor (18) in the storage position. A pin guide (32) is attached to one of the rails (19) adjacent the hinge (30), and a corresponding pin pocket (34) is attached to the side rail (13) of the main conveyor (12). A locking pin (36) is received in the pin guide (32) and a cable (38) extends along the rail (19) back to the opposite end. Eyelets (40) are spaced along the rail (19) to receive the cable (38) and a ring (42) is secured to the cable end.

In operation, the auxiliary conveyor (18) is secured in position between the main conveyor (12) and the scale platform (14) by attaching the hinge (30) to the side rail (13) of the main conveyor (12). The pin pocket (34) is also attached to the side rail (13). When placed in the horizontal working position, the check-in counter attendant simply slides the luggage (100) onto the auxiliary conveyor (18) and guides it back to the main conveyor (12). To move the auxiliary conveyor (18) to the vertical storage position, the attendant simply lifts the end that rests on the platform (14) and the auxiliary conveyor (18) moves in an upward arc, as illustrated by the directional arrow in FIG. 7. When the conveyor (18) reaches the vertical position, the locking pin (36) falls by gravity into the pin pocket (34) and secures the conveyor (18) in the storage position. To move the auxiliary conveyor (18) back to the working position, the attendant simply pulls up on the cable ring (42). This lifts the locking pin (36) from the pin pocket (34) and allows the auxiliary conveyor (18) to move in a downward arc back to the horizontal working position.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. In an environment which includes an airline check-in counter provided with a platform having a surface for receiving luggage to be checked to a destination, and a main conveyor accessible to but spaced from the platform, a luggage handling system, comprising:

a removable conveyor disposed intermediate the platform and the main conveyor whereby luggage can be moved between the platform and the main conveyor without requiring it to be manually lifted or carried; wherein, the removable conveyor has a free end associated with the platform and a hinged end connected to the main conveyor and further includes a plurality of spaced rollers mounted on the removable conveyor; wherein, the free end of the removable conveyor is further provided with luggage receiving means which are positioned below the spaced rollers and the surface of the platform for sliding luggage from said platform onto said removable conveyor.

2. The luggage handling system as in claim 1 wherein the luggage receiving means comprises a slide plate disposed proximate to, and below the free end of the removable conveyor.

3. The luggage handling system of claim 1 further including means for locking the hinged end of the removable conveyor in a vertical storage position.

4. The luggage handling system of claim 3 wherein the locking means includes:

a pin guide attached to the conveyor adjacent the hinged end;

a locking pin disposed to move within the pin guide; and dimensioned to extend beyond the hinged end; and a pin pocket attached to the main conveyor, and being disposed in vertical alignment with the pin guide and disposed to receive the locking pin when the removable conveyor is moved to the vertical storage position.

5. The luggage handling system of claim 4 further including means for releasing the locking means.

6. The luggage handling system of claim 5 wherein the releasing means includes:

a cable attached at one end to the locking pin and disposed to extend to the free end of the removable conveyor; and a ring attached to the cable at the other end and being disposed in a position accessible to an attendant.

7. The luggage handling system of claim 6 wherein the removable conveyor includes opposing side rails, and wherein a cushioned guard is releasably attached to the side rails.

8. The luggage handling system of claim 7 wherein the spaced rollers are releasably attached between the side rails by spring pins extending from ends of the rollers to engage openings in the side rails.

9. A method of handling luggage in an environment which includes an airline check-in counter provided with a platform having a surface for receiving luggage to be checked to a destination, and a main conveyor accessible to but spaced from the platform, the method comprising the steps of:

providing a removable conveyor disposed intermediate the platform and the main conveyor whereby luggage can be moved between the platform and the main conveyor, without requiring it to be manually lifted or carried; wherein, the removable conveyor has a free end associated with the platform and a hinged end connected to the main conveyor and further includes a plurality of spaced rollers mounted on the removable conveyor; wherein, the free end of the removable conveyor is further provided with luggage receiving means which are positioned below the spaced rollers and the surface of the platform for sliding luggage from said platform onto said removable conveyor.

10. The method as in claim 9 wherein the luggage receiving means comprises a slide plate disposed proximate to and below the free end of the removable conveyor.

11. The method of claim 10 further including means for locking the hinged end of the removable conveyor in a vertical storage position.

12. The method of claim 11 wherein the locking means includes:

a pin guide attached to the conveyor adjacent the hinged end;

a locking pin disposed to move within the pin guide; and dimensioned in vertical alignment with the pin guide and disposed to receive the locking pin when the removable conveyor is moved to the vertical storage position.

13. The luggage handling system of claim 12 further including means for releasing the locking means.

14. The luggage handling system of claims 13 wherein the releasing means includes:

a cable attached at one end to the locking pin and disposed to extend to the free end of the removable conveyor; and a ring attached to the cable at the other end and being disposed in a position accessible to an attendant.

15. The luggage handling system of claim 14 wherein the removable conveyor includes opposing side rails, and wherein a cushioned guard is releasably attached to the side rails.

16. The luggage handling system of claim 15 wherein the spaced rollers are releasably attached between the side rails by spring pins extending from ends of the rollers to engage openings in the side rails.

\* \* \* \* \*